Patented June 16, 1953

2,642,353

UNITED STATES PATENT OFFICE 2,642,353

ORGANIC THIOCYANATE HERBICIDES

David T. Mowry and Arthur H. Schlesinger, Dayton, Ohio, assignors to Monsanto Chemical Company, St. Louis, Mo., a corporation of Delaware No Drawing. Application August 25, 1951,
Serial No. 243,753

2 Claims. (Cl. 71—2.3)

This invention relates to organic thiocyanates and deals more particularly with new alkylbenzyl thiocyanates, to methods of preparing them and to herbicidal compositions comprising the same.

The new thiocyanates, which we have found to possess high efficiency when employed as herbicides, are alkylbenzyl thiocyanates having the general formula

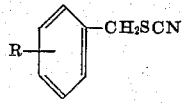

in which R is an alkyl radical of from 3 to 9 carbon atoms. As illustrative of thiocyanates having the above general formula may be mentioned 4-n-propylbenzyl thiocyanate, 2-isopropylbenzyl thiocyanate, 3-n-butylbenzyl thiocyanate, 4-tert-amylbenzyl thiocyanate, 4-n-hexylbenzyl thiocyanate, 4-(2-ethylhexyl)benzyl thiocyanate, 2-n-octylbenzyl thiocyanate and 4-tert-nonylbenzyl thiocyanate.

The present alkylbenzyl thiocyanates are readily obtainable by contacting suitable aralkyl chlorides or bromides with an inorganic thiocyanate substantially according to the scheme

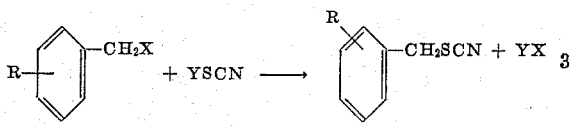

in which R is an alkyl radical of from 3 to 9 carbon atoms, X is a member of the class consisting of chlorine and bromine and Y is a member of the class consisting of ammonium, alkali metal and alkaline earth metals. Halides suitable for the present purpose include 2-alkylbenzyl chlorides or bromides in which the alkyl radical has from 3 to 9 carbon atoms. Inorganic thiocyanates which may be employed include potassium, sodium, lithium, barium, calcium, strontium, magnesium and ammonium thiocyanates.

The reaction occurs by contacting the alkylbenzyl halide compound with the inorganic thiocyanate at ordinary or increased temperatures; however, for optimum yields of the alkylbenzyl thiocyanates it is preferred to heat a mixture of the alkylbenzyl halide and the inorganic thiocyanate, advantageously in the presence of an inert solvent or diluent, at a temperature of from, say, 60° C. to the refluxing temperature of the reaction mixture for a time of from, say, a few minutes to several hours. As inert diluents there may be employed aliphatic, oxygen-containing compounds such as methanol, ethanol, isopropanol, isobutanol, acetone, ethyl acetate and isopropyl ether; nitro compounds such as the nitroparaffins and nitrobenzene, etc. In order to facilitate removal of the inorganic halide which is formed as a by-product, it is preferred to employ as a diluent a liquid in which the halide is substantially insoluble; hence, an alcoholic or ketonic diluent is generally preferred.

Inasmuch as the reaction involves the condensation of one mole of the alkylbenzyl halide with one mole of the inorganic thiocyanate, stoichiometric proportions of the reactants are advantageously employed. However, since any excess of either the halide or the thiocyanate may be readily recovered from the final product, the quantity of reactants initially employed is immaterial. It is preferred, however, to use an excess of the more readily available inorganic thiocyanate in order to assure complete reaction of the alkylbenzyl halide under the reaction conditions employed.

The present alkylbenzyl thiocyanates are stable compounds which range from clear, white liquids to waxy or crystalline solids. They are particularly valuable as herbicides, but some of this series of alkylbenzyl thiocyanates also may be advantageously employed as insecticides and pesticides in general, rubber vulcanization accelerators, etc. They are also valuable as intermediates in the production of other industrially important materials.

The invention is further illustrated, but not limited, by the following examples:

Example 1

A mixture consisting of 30 g. (0.31 mole) of potassium thiocyanate, 600 ml. of alcohol and 50.5 g. of 4-isopropylbenzyl chloride was refluxed for 3 hours. The reaction mixture was then allowed to cool and filtered in order to remove the potassium chloride which had been formed (29 g. of potassium chloride was obtained). The filtrate was added to twice its volume of water, the resulting mixture was allowed to stratify, and the aqueous phase was separated and washed with chloroform. The residual organic phase and the chloroform extract from the aqueous phase were combined and submitted to distillation in order to remove the chloroform. There was thus obtained as residue 50 g. (87% theoretical yield) of the substantially pure 4-isopropylbenzyl thiocyanate, B. P. 170–172° C./18 mm., $n_D^{25}$ 1.5509 analyzing as follows:

|  | Found | Calcd. for $C_{11}H_{13}NS$ |
|---|---|---|
| Percent C | 69.38 | 69.2 |
| Percent H | 6.57 | 6.81 |

*Example 2*

Herbicidal activity of a number of thiocyanates, including the 4-isopropylbenzyl thiocyanate of the preceding example, was determined by germination of cucumber seeds for 4 days at a temperature of 76° F. in the presence of aqueous solutions or suspensions of each of the indicated chemicals at concentrations of 100 p. p. m. Seventy-five seeds were used for each test. The results are expressed as per cent length of the primary roots in the presence of the chemical compared with the length of the primary roots of controls which had been germinated in water. The activity of two commercial herbicides as obtained by the same test are included for comparison.

| Compound Tested | Percent Growth at 100 Parts per Million |
|---|---|
| 4-Isopropylbenzyl thiocyanate | 5 |
| 1-Phenylethyl thiocyanate | 33 |
| Phenyl thiocyanate | 40 |
| α-(Thiocyanomethyl)naphthalene | 46 |
| 2,4-Dichlorophenoxyacetic acid | 6 |
| Isopropyl carbanilate | 8 |

The last two compounds are recognized in the art as valuable herbicides. At this concentration 4-isopropylbenzl thiocyanate possesses herbicidal activity of the same order.

*Example 3*

Spray testing of the herbicidal activity of the above 4-isopropylbenzl thiocyanate and some related compounds was conducted as follows:

A 1% aqueous suspension of the thiocyanate compound was prepared, employing 0.2% of an emulsifying agent known to the trade as "Emulsifier L" and comprising a mixture of a polyethylene glycol derivative and an alkylbenzenesulfonate. This 1% aqueous suspension was further diluted with water to give a suspension having a 0.3% and 0.1% concentration of the thiocyanate compound.

Three-week old corn and bean plants were respectively sprayed with 1.0% and 0.3% suspensions, two plants of each variety being used for each test. The spraying was continued until droplets formed on and/or fell from the foliage and stems of the sprayed plants, up to 15 ml. of the aqueous suspension being applied to each plant. The sprayed plants as well as two untreated "blank" specimens of each plant were then allowed to remain in the same greenhouse for a period of one week. At the end of that time the sprayed plants were compared with the untreated plants in order to determine the extent of injury, if any. The following observations were made:

| Compound Tested at Percent Concentration | Injurious Effect on— | |
|---|---|---|
|  | Bean | Corn |
| 4-Isopropylbenzyl thiocyanate: | | |
| 0.3% | Moderate | |
| 1.0% | Severe, leaves dried. | Severe, leaves dried. |
| Benzyl Thiocyanate: | | |
| 0.3% | None | Slight. |
| 1.0% | do | Moderate. |
| 4-Nitrobenzyl Thiocyanate: | | |
| 0.3% | Slight | None. |
| 1.0% | do | |

What we claim is:

1. The method of destroying undesired plants which comprises applying to said plants a toxic quantity of a herbicidal composition comprising an inert carrier and as the essential active ingredient an organic thiocyanate having the formula

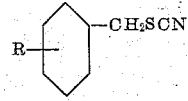

in which R is an alkyl radical of from 3 to 9 carbon atoms.

2. The method of destroying undesired plants which comprises applying to said plants a toxic quantity of a herbicidal composition comprising an inert carrier and 4-isopropylbenzyl thiocyanate as the effective essential ingredient.

DAVID T. MOWRY.
ARTHUR H. SCHLESINGER.

References Cited in the file of this patent

UNITED STATES PATENTS

| Number | Name | Date |
|---|---|---|
| 1,794,046 | Wesche et al. | Feb. 24, 1931 |
| 2,024,098 | Heckert | Dec. 10, 1935 |
| 2,459,119 | Rucker | Jan. 11, 1949 |

OTHER REFERENCES

Henry: "Ber. Deut. Chem. Gesell.," vol. 2, page 637 (1869).

Newer Methods of Preparative Organic Chemistry, Interscience Publishers (New York, 1948), page 369.